Dec. 5, 1950     T. L. FAWICK     2,532,839
METHOD OF MAKING AN ARTICLE HAVING A POROUS
INNER PART AND A MOLDED COVER THEREON
Filed Feb. 21, 1947
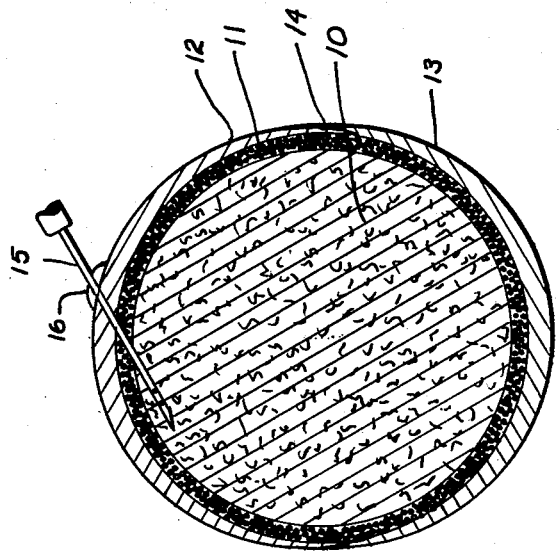
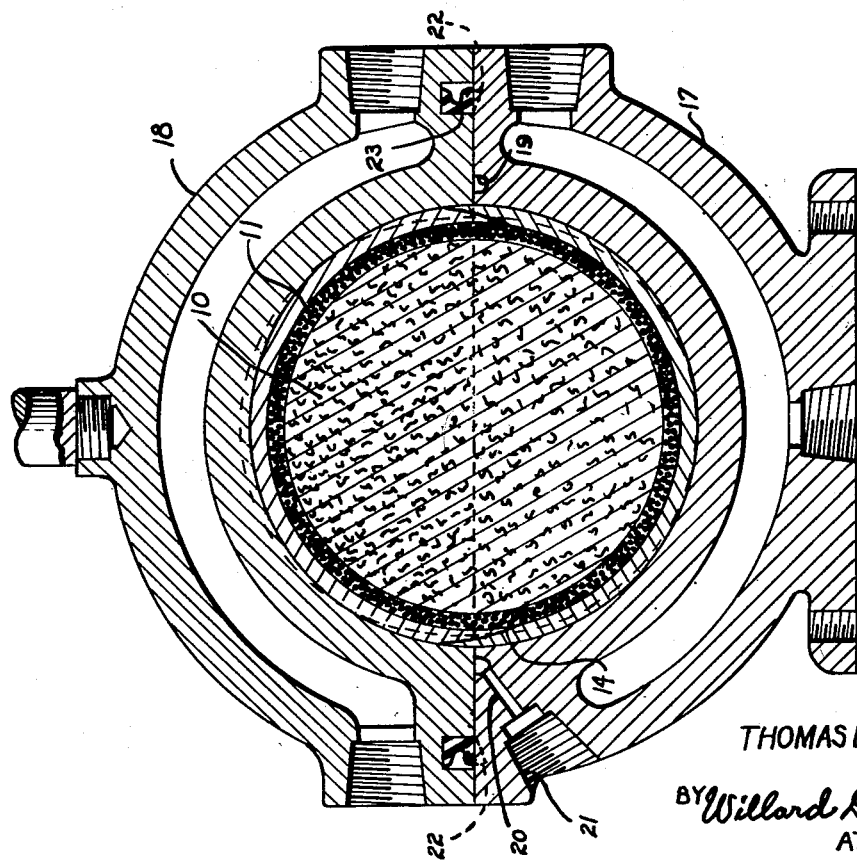
THOMAS L. FAWICK
INVENTOR
BY Willard D. Eakin
ATTORNEY Patented Dec. 5, 1950

2,532,839

UNITED STATES PATENT OFFICE 2,532,839

METHOD OF MAKING AN ARTICLE HAVING A POROUS INNER PART AND A MOLDED COVER THEREON

Thomas L. Fawick, Cleveland, Ohio

Application February 21, 1947, Serial No. 729,976

6 Claims. (Cl. 154—16)

This invention relates to procedure for making articles having a molded-plastic surface, and especially articles, such as play balls, having a fibrous body and a covering thereon of rubber or the like.

Its chief object is to provide improved procedure and apparatus adapted to avoid blemishing of the molded surface of the article by air entrapped between it and the molding surface of the mold, and especially to provide that advantage in the production of an article having internally a sub-atmospheric pressure, as for helping to hold the cover on the ball or the like.

Further objects are to provide improved procedure for obtaining and retaining a sub-atmospheric pressure in an article of the type referred to; to provide for final sealing of the cover, with sub-atmospheric pressure therein, before the article is given the final molding; to provide in an improved manner for covering an article of that type with an enclosing layer of a moldable plastic; and to provide simple, effective and inexpensive molding equipment.

Of the accompanying drawings:

Fig. 1 is a middle section of a ball showing the construction that it has before it is placed in the vulcanizing mold, in the practice of my invention in its preferred form and showing in full view a suction-applying needle as employed in one step of the preferred procedure.

Fig. 2 is a vertical middle section of a mold assembly embodying and adapted for the practice of my invention in its preferred form, with the work in place therein.

Referring to the drawings, 10 is the main body or core of an out-door or in-door baseball or the like, comprising highly compacted fibrous material, on which is the usual wrapping of cord 11, which is usually pre-treated with a binder as by dipping the cord in rubber latex.

In the preferred practice of my invention I pre-shape, preferably without much vulcanization or setting up of the material, two generally hemispherical shells 12, 13 of rubber composition or other suitable moldable plastic.

Each of the shells as thus pre-formed is of greatest thickness in what may be called its "polar" region and is of gradually diminishing thickness toward its mouth or equatorial margin.

The two pre-formed shells are then mounted upon the ball body as shown in Fig. 1 and their margins are joined in an air-tight seam at 14, the margins either adhering to each other by reason of the tackiness of the material or being caused to adhere by the use of a suitable cement. Preferably the seam is a lap seam and the two shells can be pre-formed with complemental bevels, as shown, for evenness of surface at the seam.

By reason of the graduated thickness of the shells, the assembly at this stage is of greater dimension vertically than horizontally in Fig. 1 although the ball body, and the inner face of the cover, are accurately spherical.

A suction-applying needle 15 is then inserted through the plastic cover and the cord layer, and into the fibrous core, preferably at a thick part of the cover and preferably at a large angle to the adjacent radii of the ball, so that the bevel principle will be present in the subsequent sealing of the needle hole.

A high degree of vacuum is created within the cover by means of the needle, after which the needle is withdrawn and the needle hole is immediately sealed by pressing the cover against the core at the position of the hole. If the tackiness of the stock is not sufficient to effect such sealing, one or both of the faces of the cover shell, at the position where the needle is to be inserted, can be given a dab of cement before the shell is applied to the core. Such an application of cement, in position to be sucked into the hole when the needle is withdrawn, is shown at 16 in Fig. 1.

Such evacuation of the ball causes the cover to snug down against the cord wrapping without entrapping of air between the two, as otherwise may occur locally where areas of the cord layer are impervious to air, and by inducing flow of the plastic, enhances adhesion of the several elements of the ball.

After such preparation of the ball, all of which can be done conveniently while the ball is still outside of the mold, it is placed in suitable molding apparatus, and molded to its final spherical external shape, with or without ornamentation, such as imitation of a sewed-on cover, as may be desired.

Preferably the final molding is performed in apparatus having features that are illustrated in Fig. 2.

The mold there shown comprises a fixed, steam-jacketed lower mold-section 17 and a movable steam-jacketed upper mold section 18, with suitable means for raising it and forcibly closing it against the lower mold section.

The lower mold-section is formed on its mating face with an annular over-flow cavity 19 which surrounds the mold cavity and is in communication with a suction-applying passage 20 terminating at the outer face of the mold-section in a taper-thread socket 21 for connection with a suction line.

The upper mold section on its mating face is formed with an annular recess of rectangular cross-sectional shape, in which is seated an annular, lip-type sealing ring 23 of U shape in cross-section which when in unstrained condition has its two flanges so diverging from each other, as indicated by the dotted lines at 22, 22, that in the closing movement of the upper mold section the ring's lower flange contacts the upper face of the lower mold section, in readiness to seal against it, to prevent inflow of air to the mold cavity, shortly before the mold is fully closed.

Although Fig. 2 shows a single-cavity mold, my invention is of course not limited to the specific type of mold here shown.

In the performing of the final molding operation, the ball, prepared as illustrated in Fig. 1, is placed in the lower mold section with its longest diameter vertical, permissibly while the mold-sections are hot from previous operation, and the upper mold-section is then lowered and forcibly pressed into full-closed position.

Preferably at the instant that the lower flange of the sealing ring 22 has come into full-circle contact with the lower mold-section, each mold section then having substantial pressure against only the polar regions of the ball, by reason of the vertically elongated external shape of the ball, suction is applied, through the passage 20, the annular overflow cavity 19 and the space between the mating faces of the mold-sections, to the now sealed molding cavity, so that there is sub-atmospheric pressure on the outer face of the ball and between it and the molding faces, until super-atmospheric mechanical pressure has been substituted for such suction by the forcible closing of the mold.

The prevention of air-pocket markings on the outer face of the ball is contributed to both by the fact that the mechanical molding pressures are applied to the ball by progression from its polar regions toward its equatorial region and by the fact that concurrently air is drawn from the progressively diminishing space by the suction.

Preferably the suction that is applied to the interior of the ball by means of the needle 15, and retained therein by sealing of the needle hole, is stronger than that applied to the exterior of the ball in the mold, so that the compacting and adhesion producing effects of the suction within the ball is not objectionably undone by the external suction.

When the ball has remained in the mold sufficiently long to be permanently shaped, and to be suitably vulcanized in the case of a ball on which the cover is of rubber composition, the mold is opened, and the finished ball is removed therefrom.

Both the procedure and the apparatus are susceptible of modification without departure from the scope of my invention as defined by the appended claims.

I claim:

1. The method of making a ball comprising a porous core and an impervious cover of moldable plastic material which comprises applying the cover to the core, withdrawing air from the core through a hole in the cover while the ball is unconfined, sealing the hole while a partial vacuum continues to exist in the core, and thereafter enclosing the ball in a mold and molding the cover thereon, the outer face of the cover, during the molding operation, being subjected to suction and concurrently to progressively applied mechanical molding pressure.

2. The method of making a ball having a porous core and an impervious cover of moldable plastic material which comprises preforming a set of cover sections, mounting them upon the core and seaming them to each other to provide a completely enclosing cover on the core, perforating the cover and withdrawing air from the core through the perforation while the ball is unconfined, sealing the hole while the ball remains unconfined and a partial vacuum remains in the core, and thereafter enclosing the ball in a mold and molding the cover thereon.

3. The method of making a ball having a porous core and a cover of moldable plastic thereon which comprises applying the cover to the core, withdrawing air from the pores of the core through an air passage in the cover, thus creating a partial vacuum in said pores so that said vacuum snugs the cover to the core by reason of atmospheric pressure against the outer face of the cover, making the cover impervious to air and thereby entrapping a partial vacuum in the said pores, and then mechanically molding the cover against the core.

4. The method of making an article which comprises applying to a porous member a cover layer of moldable plastic, creating and locally entrapping a partial vacuum in the pores of said member while the member and the cover layer are unconfined and freely manipulatable, whereby the cover layer is sucked against said member, and thereafter setting the plastic while the pores of said member are out of communication with the exterior of the cover layer.

5. The method of making an article which comprises applying to a porous member a cover layer of moldable plastic, creating and locally entrapping a partial vacuum in the pores of said member while the member and the cover layer are unconfined and freely manipulatable, whereby the cover layer is sucked against said member, and thereafter changing the external contour of the cover layer by mechanically molding the cover layer against said member, substantially throughout the extent of the cover layer, while the pores of said member are out of communication with the exterior of the cover layer.

6. The method of making an article which comprises applying to a porous member a cover layer of moldable plastic, creating and locally entrapping a partial vacuum in the pores of said member while the member and the cover layer are unconfined and freely manipulatable, whereby the cover layer is sucked against said member, and thereafter mechanically molding the cover layer against said member while the pores of said member are out of communication with the exterior of the cover layer, and while maintaining a partial vacuum on the outer face of the cover layer.

THOMAS L. FAWICK.

REFERENCES CITED

The following references are of record in the file of this patent:

UNITED STATES PATENTS

| Number | Name | Date |
|--------|------|------|
| 758,851 | Richards | May 3, 1904 |
| 1,592,536 | O'Neill | July 13, 1926 |
| 2,081,177 | Talalay | May 25, 1937 |
| 2,127,487 | Voit | Aug. 17, 1938 |
| 2,213,479 | Voit et al. | Sept. 3, 1940 |
| 2,224,363 | Voit et al. | Dec. 10, 1940 |
| 2,288,356 | Humphrey | June 30, 1942 |
| 2,310,404 | Dodge | Feb. 9, 1943 |
| 2,364,029 | Ryan | Nov. 28, 1944 |
| 2,429,122 | Crowley | Oct. 14, 1947 |